United States Patent
Usui

[11] Patent Number: 5,780,386
[45] Date of Patent: Jul. 14, 1998

[54] METALLIC SUPPORT

[75] Inventor: Masayoshi Usui, Numazu, Japan

[73] Assignee: Usui Kokusai Sangyo Kaisha, Ltd., Shizuoka, Japan

[21] Appl. No.: 596,191

[22] PCT Filed: Sep. 8, 1994

[86] PCT No.: PCT/JP94/01485

§ 371 Date: May 15, 1996

§ 102(e) Date: May 15, 1996

[87] PCT Pub. No.: WO95/07143

PCT Pub. Date: Mar. 16, 1995

[30] Foreign Application Priority Data

Sep. 9, 1993 [JP] Japan ............... 5-247305

[51] Int. Cl.[6] .................. B01J 21/04; B01D 50/00
[52] U.S. Cl. .................. 502/439; 502/527; 422/180; 261/DIG. 72
[58] Field of Search .................. 502/527, 439; 422/180; 261/DIG. 72

[56] References Cited

U.S. PATENT DOCUMENTS

| | | | |
|---|---|---|---|
| 899,898 | 9/1908 | Petersen | 261/DIG. 72 |
| 899,899 | 9/1908 | Petersen | 261/DIG. 72 |
| 2,183,657 | 12/1939 | Page | 261/DIG. 72 |
| 3,208,833 | 9/1965 | Carson | 261/DIG. 72 |
| 4,305,910 | 12/1981 | Kudo et al. | 422/179 |
| 4,388,277 | 6/1983 | Wright | 261/DIG. 72 |
| 4,471,014 | 9/1984 | Den Hartog et al. | 261/DIG. 72 |
| 5,163,291 | 11/1992 | Hitachi et al. | 422/180 |
| 5,260,035 | 11/1993 | Lachman et al. | 422/180 |
| 5,272,875 | 12/1993 | Kaji | 422/180 |
| 5,302,355 | 4/1994 | Fujikura et al. | 422/180 |
| 5,346,675 | 9/1994 | Usui et al. | 502/527 |
| 5,447,697 | 9/1995 | Ito et al. | 422/180 |
| 5,486,338 | 1/1996 | Ota et al. | 502/527 |
| 5,591,413 | 1/1997 | Toyoda | 422/180 |

FOREIGN PATENT DOCUMENTS

| | | | |
|---|---|---|---|
| 63-13684 | 1/1988 | Japan | B23K 20/00 |
| 63-273517 | 11/1988 | Japan | . |
| 63-315150 | 12/1988 | Japan | B01J 35/04 |
| 63-315151 | 12/1988 | Japan | B01J 35/04 |

*Primary Examiner*—Elizabeth D. Wood
*Assistant Examiner*—Patricia L. Hailey
*Attorney, Agent, or Firm*—McDermott, Will & Emery

[57] ABSTRACT

The present invention provides a metallic support, which is superior in economy and also in various properties such as durability and exhaust gas cleaning ability to conventional metallic supports, each of which is composed, as a principal element, of a metallic honeycomb body of a honeycomb structure making use of expensive planar band(s) and/or corrugated band(s) [sheet(s)] or conventional metallic supports, each of which is of a honeycomb structure constructed by close-packing small-diameter tubes within a metal casing.

Namely, the metallic support according to the present invention for supporting thereon a cleaning catalyst for exhaust gas comprises (i) a cylindrical metal casing;
(ii) a desired number of small-diameter open tubes of a desired cross-sectional shape arranged within the metal casing; and
(iii) metal wires fixing the small-diameter open tubes arrayed within the metal casing.

7 Claims, 5 Drawing Sheets

1

METALLIC SUPPORT

TECHNICAL FIELD

This invention generally relates to a metal-made support suitable for use in an exhaust gas cleaning system of an automotive vehicle to support thereon an exhaust gas cleaning catalyst.

More specifically, this invention is concerned with an economical metallic support which is excellent in properties such as durability and which features, as constituent members of a metal-made support, use of a cylindrical metal casing, small-diameter open tubes arranged in the metal casing and metal wires fixing the tubes in the metal casing in place of conventional planar band(s) [sheet(s)] or corrugated band(s) [sheets] made of a costly heat-resistant steel.

BACKGROUND ART

Known catalyst supports of the above-described sort for exhaust gas cleaning systems include two types, one being the ceramic-made monolithic type (ceramic monoliths) and the other the metal-made monolithic type (metallic monoliths).

Especially in recent days, a great deal of research and development work has been concentrated on metallic monoliths with a view to improving drawbacks of ceramic monoliths, in other words, from the view-points of mechanical strength, durability, flow resistance, cleaning efficiency (the size reduction of a system) and the like.

Typical examples of conventional metal-made catalyst supports of this type (MS', metallic supports") are illustrated in FIG. 11 and FIG. 12. A metallic support of this type is constructed of a metallic honeycomb body and a cylindrical metal-made casing 4 opening at opposite ends thereof and fixedly enclosing the metallic honeycomb body therein. In general, the metallic honeycomb body has been fabricated by stacking a planar band 1, which is made of a steel sheet excellent in high-temperature oxidation resistance and heat resistance, and a corrugated band 2, which has been formed by corrugating a similar steel sheet, one over the other in a mutually contiguous relation and then rolling them together into a spiral form or by stacking such planar bands and corrugated bands into a multilayered form, so that the honeycomb body defines a number of network-patterned gas flow passages (cells) for permitting axial passage of exhaust gas therethrough.

Incidentally, FIG. 11 illustrates the rolled metallic honeycomb body H while FIG. 12 depicts the stacked metallic honeycomb body H.

The metallic honeycomb body and the metal-made casing, which make up the above-described metallic support, are then firmly fixedly together by brazing or welding so that they can withstand thermal expansions and thermal stresses—which occur due to the high temperature of exhaust gas itself and an exothermic reaction of the exhaust gas by the cleaning catalyst (a catalyst formed of Pt, Pd, Rh and the like)—and also vibrations during running of the automotive vehicle. Needless to say, the planar band(s) and the corrugated band(s), which form the metallic honeycomb body, are also fixed together at points or areas of contact therebetween by one of various methods.

As the planar band(s) 1 and the corrugated band(s) 2 in each of the above-described conventional honeycomb bodies H, it is possible to use bands (sheets) having a thickness not greater than 0.1 mm and made of a material such as a heat-resistant stainless steel, e.g., chromium steel (chromium content: 13–25%) or Fe—20%Cr—5%Al, or a stainless steel formed by adding one or more rare earth metals to the former stainless steel to improve the high-temperature oxidation resistance. An Al-containing steel band is an extremely preferred material as each band, because it is equipped with improved high-temperature oxidation resistance and, when subjected to heat treatment, $\alpha$-$Al_2O_3$ is caused to deposit in various forms such as whisker and mushroom forms on its surfaces and serves to firmly hold a wash coat for carrying the exhaust gas cleaning catalyst.

The planar band(s) 1 and corrugated band(s) 2, which make up the metal-made honeycomb body H, are however extremely costly because their material itself is expensive and a rolling cost is needed to form the material into sheets (thickness: 0.04–0.1 mm) suited for this kind of application. The use of such costly bands had reduced the price competitive power of the metallic honeycomb body compared with ceramic-made honeycomb bodies. Further, an expensive high-temperature brazing material such as a Ni-base brazing material is used upon brazing the individual components in the fabrication of the metallic honeycomb body as described above, resulting in a further fabrication cost increase in this respect.

In addition, a metallic honeycomb body fabricated using such expensive planar band(s) 1 and corrugated band(s) 2 as described above has a small effective surface area for supporting an exhaust gas cleaning catalyst because the bands 1,2 are maintained in a mutually contiguous relation.

Described specifically, the planar and corrugated bands 1,2 are arranged in a contiguous relation so that each corrugated band 2 is in contact at ridges or grooves thereof with the associated planar band 1. The bands 1,2 are not in such a point-to-point contiguous relation as allowing to support the catalyst as much as possible at contacted portions, but are in an area-to-area contact. The above-described effective surface area has therefore been decreased. Depending on the manner of contact between the bands 1,2, the effective surface area may be decreased by as much as 30% in some instances. It can hence be mentioned that, despite the use of the expensive bands 1,2, these bands 1,2 are not utilized fully.

In the present field of art, techniques have also been proposed to fabricate a metallic honeycomb body, which is a principal component of a metallic support, from plural thin-wall, small-diameter tubes (small tubes) without using the above-described planar band(s) 1 and corrugated band(s) 2 (see, for example, Japanese Patent Application Laid-Open Nos. SHO 63-13684, SHO 63-273517, SHO 63-315150 and SHO 63-315151).

According to these techniques, the small tubes are however assembled into the honeycomb body with their outer peripheral walls brought in close contact with each other. As described above, the effective surface area for supporting the exhaust gas cleaning catalyst is therefore reduced substantially.

DISCLOSURE OF THE INVENTION

The present invention has been completed based on the finding that a metallic support having excellent properties such as durability and exhaust gas cleaning properties can be obtained along with a cost merit when, different from the above-described metallic support making use of expensive band materials (sheet materials), plural small-diameter open tubes of a desired cross-sectional shape (tubes) are arranged within a cylindrical metal casing and are then fixed together at desired intervals by metal wires.

Further, the present invention has also been completed based on the finding that, as opposed to the conventional metallic honeycomb body of the honeycomb structure formed basically of small tubes with their outer peripheral walls maintained in close contact with each other, arrangement of small tubes within a metal casing without maintaining their outer peripheral walls into close contact with each other makes it possible to use fewer small tubes owing to a substantial increase in the amount of a supported catalyst and also to improve the exhaust gas cleaning ability due to agitation and turbulence of exhaust gas in spaces formed between the individual small tubes and the finding that use of open tubes as small tubes promotes further agitation and turbulence of exhaust gas inside the metallic honeycomb body and brings about preferred results in cleaning ability.

The present invention therefore provides a metallic support for an exhaust gas cleaning catalyst, which is economical and is excellent in various properties.

Describing the present invention in brief, the present invention relates to a metallic support for an exhaust gas cleaning catalyst, characterized in that the metallic support comprises:

(i) a cylindrical metal casing;

(ii) a desired number of small-diameter open tubes of a desired cross-sectional shape arranged within the metal casing; and (iii) metal wires fixing the small-diameter open tubes arrayed within the metal casing.

BRIEF DESCRIPTION OF THE DRAWINGS

FIG. 4 is a side view of the tube of FIG. 3 in which the tube is partly seen through;

Figure 1:
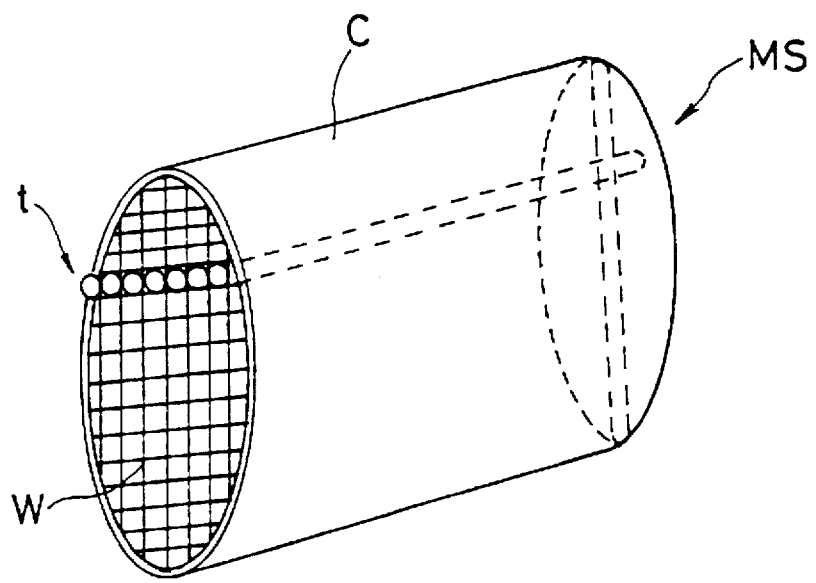
FIG. 1 is a perspective view of a metallic support according to the present invention, in which the metallic support is partly seen through and is partly omitted.

Incidentally, the symbols in the individual drawings have the following meanings:

| MS | Metallic support. |
|---|---|
| C | Metal casing. |
| $t, t_1, t_2, t_3$ | Small-diameter hollow tubes |
| $S_1, S_2, S_3, \ldots$ | Slits |
| $W, W_1, W_2, W_3$ | Metal wires. |
| $f_1, f_2, f_3$ | Fixed portions. |
| MS' | Conventional metallic supports. |
| H | Conventional metallic honeycomb bodies. |
| 1 | Planar bands. |
| 2 | Corrugated bands. |
| 3 | Network-patterned gas flow passages (cells). |

BEST MODE FOR CARRYING OUT THE INVENTION

The technical features and embodiments of the present invention will hereinafter be described with reference to the drawings.

Needless to say, it is to be borne in mind that the present invention is not limited to the embodiments illustrated in the drawings.

FIG. 1 is a perspective view of a metallic support MS according to the present invention, in which the metallic support is partly seen through and is partly omitted.

As is shown in the drawing, the metallic support MS according to the present invention comprises three components which are a metal casing C made of a heat-resistant steel, small-diameter open tubes 5 made of a heat-resistant steel and arranged within the metal casing C, and metal wires W fixing the open tubes t arranged within the metal casing C.

Incidentally, the term "open tube" as used herein means a tube having a single strip of slit in an outer wall thereof. The concept of "open tube" embraces a tubular body fabricated by rolling a sheet material with the rolled end maintained open without joining the same.

No particular limitation is imposed on the metal casing C which forms the metallic support MS according to the present invention, insofar as the metal casing is of a structure suited for internally accommodating the small-diameter open tubes t and also for fixing the small-diameter open tubes t by the metal wires W.

Within the metal casing C, the small-diameter open tubes t can be fixed in any desired manner.

FIG. 1 illustrates the manner that at opposite end faces of the metal casing C, the metal wires W are arranged taut in a crosshatch pattern and the small-diameter open tubes t are held between the metal wires W. Although not shown in the drawing, it is also possible to bore apertures at predetermined pitches in an angular direction through an outer peripheral wall of the metal casing C at positions axially apart by a predetermined distance from the end faces of the metal casing C, to arrange metal wires W taut between the apertures and then to hold and fix small-diameter open tubes t between these wires.

Figure 11:
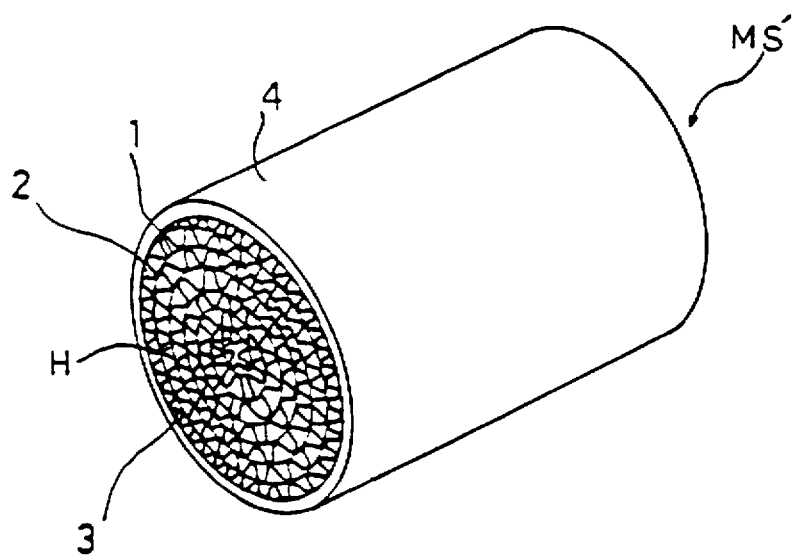
FIG. 11 is a perspective view of a conventional rolled metallic honeycomb body.
Figure 12:
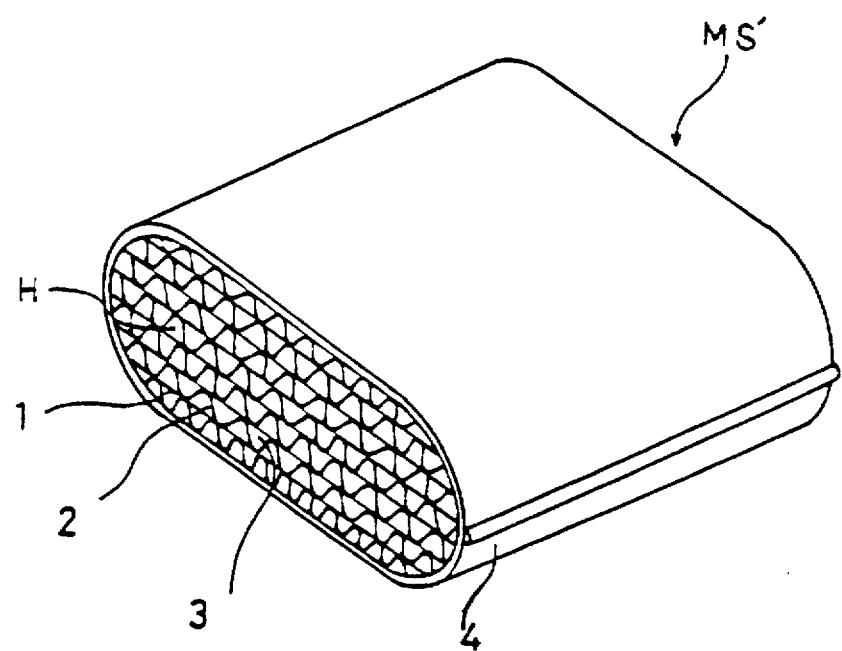
FIG. 12 is a perspective view of a conventional stacked metallic honeycomb body.

As the material of the metal casing C in the metallic support MS according to the present invention, a heat-resistant steel similar to that employed for the fabrication of the conventional metallic honeycomb bodies shown in FIGS. 11–12 can be used. Also usable is a steel having high heat resistance and corrosion resistance.

It is also possible to use a material of a double layer structure in which the metal material of the outer layer is higher in heat resistance and corrosion resistance than that of the inner layer, specifically, a double-layer material making use of a ferrite stainless steel as the inner layer and an austenite stainless steel as the outer layer.

No particular limitation is imposed on the metal wires which also form the metallic support MS according to the present invention, insofar as they are suited in arranging the small-diameter open tubes t within the metal casing C as illustrated in the drawing.

Preferred as the material of the metal wires W is a material having similar properties as the planar band(s) [sheet(s)] or corrugated band(s) [sheet(s)] used for the fabrication of the conventional metallic honeycomb bodies shown in FIGS. 11–12, namely, a material excellent in high-temperature oxidation resistance. For example, a wire material such as Fe—20Cr—5Al or an alloy obtained by adding one or more rare earth metals to it is used.

The cross-sectional shape of the metal wires W is generally circular. They may however have a non-circular cross-sectional shape such as an oval, polygonal or rectangular cross-sectional shape. As a further alternative, they may be twisted or may be used in combination.

The metal wires W can have a desired wire diameter or thickness. In the case of wires having a circular shape in cross-section, for example, those having a wire diameter of 0.1 to 1.0 mm are used in general.

Further, flattened ribbon wires can also be used as the metal wires W in the present invention. Use of flattened ribbon wires as the metal wires W is preferred because they permit stronger fixing of the small-diameter open tubes within the metal casing C. As ribbon wires of this type, those of 100 μm in thickness and 5 mm in width can be used by way of example.

A description will next be made of the construction of the small-diameter open tubes t of a desired cross-sectional shape which also form the metallic support MS according to the present invention.

Figure 2:
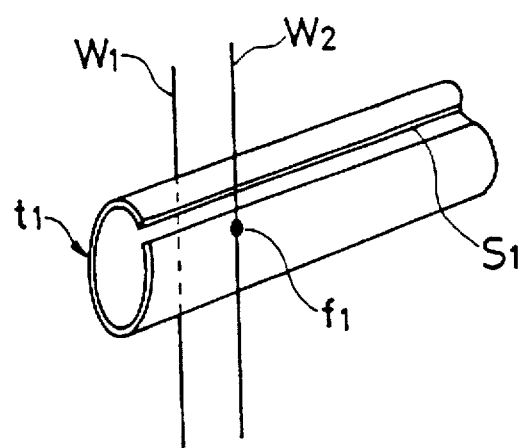
FIG. 2 is a schematic view illustrating the construction of a small-diameter open tube according to a first embodiment applicable to the metallic support according to the present invention.

FIG. 2 illustrates the construction of a small-diameter open tube $t_1$ according to a first embodiment applicable to the metallic support MS of the present invention shown in FIG. 1.

The small-diameter open tube $t_1$ according to the first embodiment is a cylindrical small-diameter open tube having a desired diameter as illustrated in the drawing and is provided in an outer wall thereof with a single strip of slit (groove-shaped space) $S_1$.

FIG. 2 illustrates that the small-diameter open tube $t_1$ is fixed at fixed portions $f_1$ by two metal wires $W_1, W_2$. As the fixing method, a desired method can be adopted such as welding, brazing or diffusion joining by thermal diffusion treatment. It is also possible to employ such a holding method that the small-diameter open tube is mechanically held between metal wires as will be described subsequently herein.

In FIG. 2, horizontal metal wires are omitted to simplify the drawing. Needless to say, metal wires may be arranged taut in only the vertical direction or in both the vertical and horizontal directions, that is, in a crosshatch pattern in the present invention.

Since the small-diameter open tube $t_1$ according to the first embodiment of the present invention has the single strip of slit $S_1$, exhaust gas is allowed to freely flow from the inside to the outside and vice versa through the slit when the tube is arranged within the metal casing C and fixed by the metal wires W. The exhaust gas can therefore be thoroughly agitated and rendered turbulent within the metallic support MS, thereby making it possible to show excellent properties such as eqalization of temperature inside the metallic support MS, prevention of localized occurrence of thermal stress and improved cleaning ability for exhaust gas.

The number of small-diameter open tubes $t_1$ to be employed can be determined as needed from the viewpoint of target cleaning ability for exhaust gas (i.e., a preset degree of cleaning) or the like. For example, to achieve exhaust gas cleaning ability equivalent to that of the conventional rolled or stacked metallic honeycomb body shown in FIG. 11 or 12 and formed of the planar band(s) and the corrugated band(s), the following values set as the number of tubes to be used may be referenced.

To achieve cleaning ability equivalent to that of a cylindrical rolled metallic honeycomb body fabricated using bands (sheets) of 60.5 mm in diameter and 75 mm in length (sheet thickness: 50 μm; cell density: 200 cpsi), the metallic support according to the present invention is required to have a similar supporting surface area for an exhaust gas cleaning catalyst.

When cylindrical small-diameter open tubes of 1.4 mm in inner diameter, 1.5 mm in outer diameter, 0.5 mm in slit width and 75 mm in length are used as the cylindrical small-diameter open tubes $t_1$, 810 tubes are needed.

Further, when cylindrical small-diameter open tubes of 1.1 mm in inner diameter, 1.3 mm in outer diameter, 0.5 mm in slit width and 75 mm in length are used as the cylindrical small-diameter open tubes $t_1$, 1030 tubes are needed.

Figure 3:
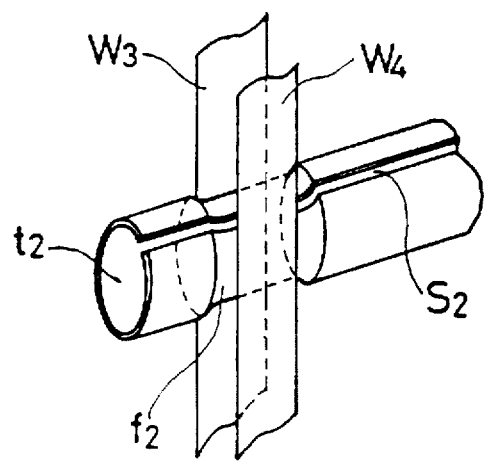
FIG. 3 is a schematic view showing the construction of a small-diameter open tube according to a second embodiment applicable to the metallic support according to the present invention.
Figure 4:
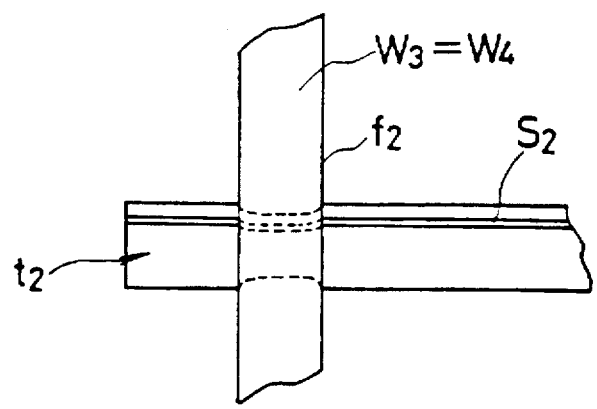

FIGS. 3 through 4 are schematic views illustrating a small-diameter open tube $t_2$ according to a second embodiment applicable to the metallic support MS according to the present invention.

The small-diameter open tube $t_2$ according to the second embodiment is in the form of a cylindrical tube with a slit $S_2$ defined therein and at desired locations, has recesses $f_2$ at portions to be fixed by the metal wires W. The small-diameter open tube $t_2$ is held at the recesses $f_2$ by two ribbon wires $W_3, W_4$. In the present invention, the cylindrical tube can be held and fixed not only by the two ribbon wires $W_3, W_4$ but also by applying a fixing method such as welding or brazing at the recesses $f_2$.

Figure 5:
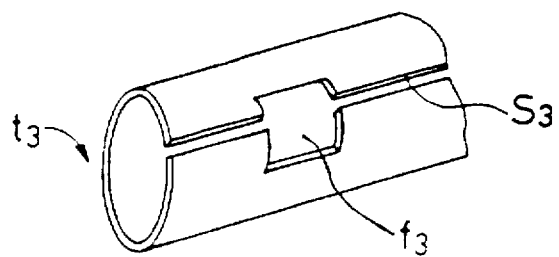
FIG. 5 is a schematic view depicting the construction of a small-diameter open tube according to a third embodiment applicable to the metallic support according to the present invention.

FIG. 5 is a drawing showing a small-diameter open tube $t_3$ according to a third embodiment applicable to the metallic support MS according to the present invention.

The small-diameter open tube $t_3$ according to the third embodiment is in the form of a cylindrical tube with a slit $S_3$ defined therein and at desired locations, has openings $f_3$ in side walls portions of the tube as portions to be fixed by the metal wires W.

Figure 6:
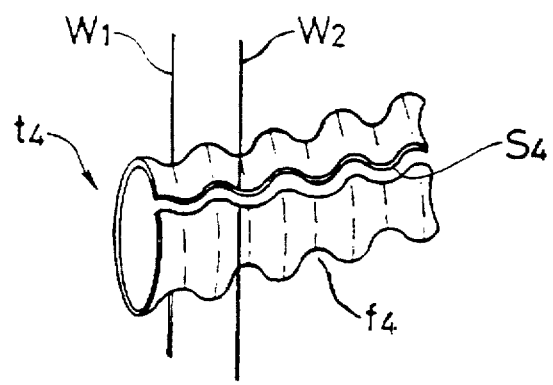
FIG. 6 is a schematic view illustrating the construction of a small-diameter open tube according to a fourth embodiment applicable to the metallic support according to the present invention.

FIG. 6 is a drawing showing a small-diameter open tube $t_4$ according to a fourth embodiment applicable to the metallic support MS according to the present invention.

The small-diameter open tube $t_4$ according to the fourth embodiment is in the form of a tube having a corrugated cylindrical peripheral wall with a slit $S_4$ defined therein.

Each portion $f_4$ to be fixed by the metal wire W is located at the corrugated portion. The small-diameter hollow tube $t_4$ according to the fourth embodiment can support the catalyst in a greater amount because its outer peripheral wall is corrugated and has a greater surface area than the cylindrical ones.

Figure 7:
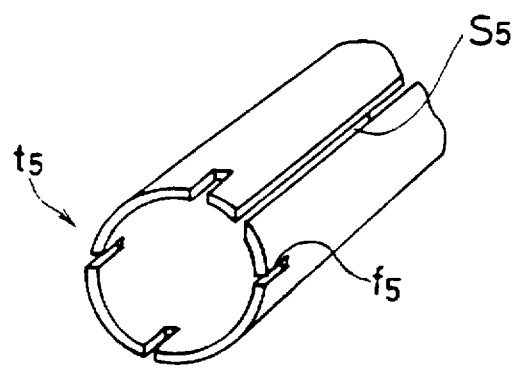
FIG. 7 is a schematic view showing the construction of a small-diameter open tube according to a fifth embodiment applicable to the metallic support according to the present invention.

FIG. 7 is a drawing showing a small-diameter open tube $t_5$ according to a fifth embodiment The small-diameter open tube $t_5$ according to the fifth embodiment is in the form of a cylindrical tube and, in a wall portion at each of opposite ends of the tube, is provided with slots $f_5$ formed at angular intervals of ¼ of a circle.

The small-diameter open tubes t applicable to the metallic support MS according to the present invention are not limited to the above-described tubes having a circular cross-sectional shape, and small-diameter hollow tubes of a desired shape can also be used.

Figure 8:
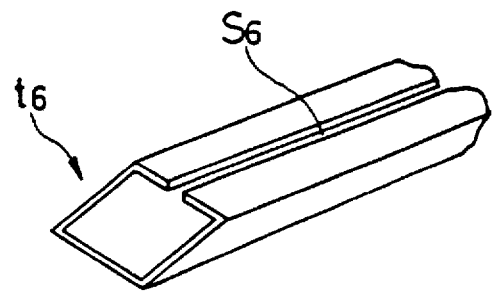
FIG. 8 is a schematic view showing the construction of a small-diameter open tube according to a sixth embodiment applicable to the metallic support according to the present invention.

FIG. 8 illustrates a small-diameter open tube $t_6$ with a slit $S_6$ defined therein according to a sixth embodiment of the present invention, which has a rhombic shape in cross-section.

Figure 9:
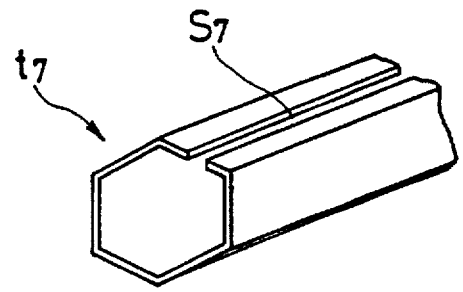
FIG. 9 is a schematic view depicting the construction of a small-diameter open tube according to a seventh embodiment applicable to the metallic support according to the present invention.

FIG. 9 depicts a small-diameter open tube $t_7$ with a slit $S_7$ defined therein according to a seventh embodiment of the present invention, which has a hexagonal shape in cross-section.

Although not specially shown in any of the drawings, the cross-sectional shape may also be oval.

Figure 10:
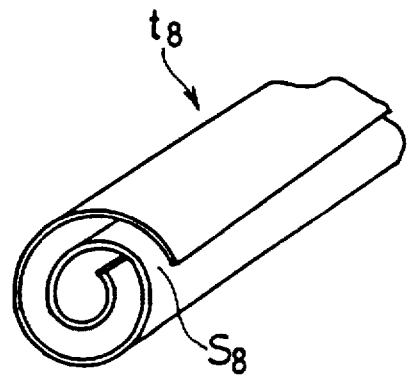
FIG. 10 is a schematic view depicting the construction of a small-diameter open tube according to an eighth embodiment applicable to the metallic support according to the present invention.

FIG. 10 depicts a small-diameter open tube $t_8$ according to an eighth embodiment of the present invention applicable to the metallic support MS according to the present invention. The embodiment shown in FIG. 10 has been formed by rolling a sheet material with the rolled end maintained open, so that the open portion defines a groove-shaped space. Small-diameter open tubes of this type are embraced in the concept of open tubes in the present invention.

In the present invention, various modifications are feasible with respect to the construction of the small-diameter open tubes t and their arrangement method. For example, although not illustrated in any of the drawings, the metallic support MS may be provided in a central part thereof with open tubes having a smaller diameter than those arranged in the remaining part. Further, tubes of more than one kind can be combined. Needless to say, small-diameter hollow tubes free of any open portion (groove-shaped space) can be combined in the latter case.

In the present invention, the density of arrangement of these tubes can be determined as needed. For example, the arrangement of tubes of the smaller diameter in the central part of the metallic support MS makes it possible to support the catalyst in a desired amount commensurate with exhaust gas flowing at a high flow rate through the central part, whereby uniform cleaning ability can be attained.

As the manner of arrangement of the small-diameter open tubes t, the small-diameter open tubes can be arranged between metal wires arranged taut in only the vertical direction or the horizontal direction. In this case, the individual small-diameter open tubes t may be maintained in contact with each other between upper and lower rows or between left and right columns, or may be arranged at desired intervals.

ADVANTAGES OF THE INVENTION

Compared with the conventional metallic supports composed, as principal elements, of metallic honeycomb bodies of various types of honeycomb structures formed of planar band(s) [sheet(s)] and corrugated bands [sheet(s)] or the conventional metallic supports of honeycomb structures formed by close-packing small-diameter tubes within metal casings, the metallic support MS according to the present invention for supporting an exhaust gas cleaning catalyst exhibits the following excellent advantages:

(i) As the metallic support MS according to the present invention is of the construction that the small-diameter open tubes are arranged and fixed by the metal wires within the metal casing, deforming force which is developed based on large thermal stress produced inside the metallic support during use of the metallic support can be absorbed and reduced by the small-diameter open metal tubes and metal wires. The metallic support according to the present invention is therefore excellent in durability. In contrast, the conventional metallic supports composed, as principal elements, of the metallic honeycomb bodies making use of the bands (sheets) or the conventional metallic supports of the honeycomb structures formed by close-packing the small-diameter tubes within the metal casings are low in the ability to absorb and reduce the above-described deforming force.

(ii) The metal support MS according to the present invention is in the form of an array of the small-diameter open tubes arranged via the metal wires. A stream of exhaust gas can therefore be agitated and made turbulent between the individual small-diameter open tubes, thereby improving the efficiency of contact between the exhaust gas and the exhaust gas cleaning catalyst supported on surfaces of the small-diameter open tubes and hence enhancing the cleaning ability. In contrast, the conventional metallic supports each of which has the honeycomb structure making use of the bands (sheets) or formed by close-packing small-diameter tubes within the metal casing require special means if it is desired to form a turbulent flow.

(iii) As small tubes, the metallic support MS according to the present invention makes use of those having a single strip of slit (groove-shaped space) in the walls thereof. The above advantage (ii) is hence enhanced, thereby showing excellent properties such as equalization in the temperature inside the metal support MS (prevention of occurrence of abnormal thermal stress), uniform cleaning ability, and improved cleaning ability owing to agitation and turbulence of exhaust gas.

(iv) In the metallic support MS according to the present invention, the individual small-diameter open tubes can be arranged and fixed at desired intervals via the metal wires within the metal casing. The individual small-diameter open tubes are therefore out of contact with each other, thereby making it possible to effectively utilize outer surfaces of the individual tubes for supporting the catalyst (i.e., to achieve a large specific surface area per unit weight).

(v) Although the conventional bands (sheets) are extremely costly, the metallic support employed in the present invention and constructed of the array of the small-diameter open tubes is economical so that a cost merit can be obtained.

(vi) Compared with the conventional metallic honeycomb bodies of the honeycomb structures making use of the bands (sheets) and the conventional metallic honeycomb bodies of the honeycomb structures obtained by close-packing the small-diameter tubes within the metal casings, the present invention has made it possible to fabricate an optimal metallic support with design freedom in accordance with properties required from the exhaust gas system. A metallic support conforming with required properties can be readily provided, for example, by changing the density of arrangement of small-diameter open tubes or the diameter of tubes in the center (central part) of the metallic support.

CAPABILITY OF EXPLOITATION IN INDUSTRY

Compared with the conventional metallic supports composed, as principal elements, of the honeycomb bodies of the honeycomb structures making use of the planar and corrugated bands (sheets) and the conventional metallic supports of the honeycomb structures obtained by close-packing the small-diameter tubes within the metal casings, the metallic support according to the present invention is superior in thermal stress absorbing and reducing characteristics, exhaust gas cleaning ability, economy and the like.

Accordingly, the metallic support according to the present invention can be suitably used in an exhaust gas cleaning device.

I claim:

1. A metallic support for an exhaust gas cleaning catalyst, comprising:

(i) a cylindrical metal casing;

(ii) a plurality of small-diameter open tubes, each arranged within the metal casing, each of said open tubes having at least one slot which extends axially along the full length of the tube to permit a stream of gas to exit therefrom and to be agitated and made turbulent between the individual small-diameter tubes; and (iii) metal wires fixing the small-diameter open tubes in an array within the metal casing.

2. A metallic support according to claim 1, wherein the small-diameter open tubes are supported in said casing by the metal wires which are tautly strung through an interior of the casing, each of said tubes being fixedly connected to the metal wires by welding, brazing or diffusion joining.

3. A metallic support according to claim 1, wherein the small-diameter open tubes have fixed portions which mechanically engage the metal wires.

4. A metallic support according to claim 3, wherein the fixed portions are recesses, openings, slots or corrugations formed in side portions of the tubes.

5. A metallic support according to claim 3, wherein the fixed portions are slots formed in end portions of the tubes.

6. A metallic support according to claim 1, wherein the metal wires have a flattened ribbon configuration.

7. A metallic support according to claim 1, wherein the slot extends axially along the full length of each tube.

* * * * *